(12) United States Patent
Seybold

(10) Patent No.: US 8,706,535 B2
(45) Date of Patent: Apr. 22, 2014

(54) TRANSFORMING A PRIORITIZED PROJECT HIERARCHY WITH WORK PACKAGES

(75) Inventor: Charles A. Seybold, Sammamish, WA (US)

(73) Assignee: LiquidPlanner, Inc., Bellevue, WA (US)

( * ) Notice: Subject to any disclaimer, the term of this patent is extended or adjusted under 35 U.S.C. 154(b) by 0 days.

(21) Appl. No.: 13/182,411

(22) Filed: Jul. 13, 2011

(65) Prior Publication Data

US 2012/0035974 A1 Feb. 9, 2012

Related U.S. Application Data

(60) Provisional application No. 61/363,765, filed on Jul. 13, 2010.

(51) Int. Cl.
*G06Q 10/06* (2012.01)
(52) U.S. Cl.
USPC .......................... 705/7; 705/8; 705/9
(58) Field of Classification Search
CPC ..................................................... G06Q 10/06
USPC ....................................................... 705/7, 8, 9
See application file for complete search history.

(56) References Cited

U.S. PATENT DOCUMENTS

| | | | |
|---|---|---|---|
| 2005/0165631 A1* | 7/2005 | Horvitz | 705/7 |
| 2008/0066072 A1* | 3/2008 | Yurekli et al. | 718/104 |
| 2008/0270210 A1* | 10/2008 | Kratschmer et al. | 705/7 |
| 2009/0055228 A1 | 2/2009 | Henry et al. | |
| 2009/0055237 A1 | 2/2009 | Henry et al. | |
| 2009/0217278 A1* | 8/2009 | Chaffee et al. | 718/103 |
| 2010/0257015 A1* | 10/2010 | Molander | 705/9 |
| 2013/0096971 A1* | 4/2013 | Gupta et al. | 705/7.15 |

* cited by examiner

*Primary Examiner* — Nga B. Nguyen
(74) *Attorney, Agent, or Firm* — Perkins Coie LLP

(57) ABSTRACT

A software and/or hardware facility to improve the management of project schedules containing prioritized tasks. The project management facility allows a user to create one or more work packages by selecting tasks from one or more existing projects. Each work package is a collection of tasks that are to be executed out of order from the project or projects from which the tasks were selected. At the same time, the facility maintains the prioritization of the tasks in the original project or projects from which the tasks were selected. When tasks are added to a work package, the facility recalculates the work package schedule and any impacted project schedules to reflect the re-prioritization of the task. In some embodiments, the facility generates a link between each task that is contained in a work package and the project from which the task was selected.

26 Claims, 6 Drawing Sheets

TRANSFORMING A PRIORITIZED PROJECT HIERARCHY WITH WORK PACKAGES

CROSS-REFERENCE TO RELATED APPLICATION(S)

This application claims the benefit of U.S. Provisional Application No. 61/363,765 filed on Jul. 13, 2010 and titled "TRANSFORMING A PRIORITIZED PROJECT HIERARCHY WITH WORK PACKAGES," which is incorporated herein by reference in its entirety.

BACKGROUND

When managing a complex project, it is helpful to divide the project into a number of tasks that must be performed to completion to achieve the purpose of the project. Although the scope and importance of an individual task to the overall project may vary, each task of the project can be defined in a manner that describes the task, allows assignment of the task to a party or parties responsible for the completion of the task, provides an estimated start time and an estimated finish time for the task, and/or provides an estimate effort for the task. A description of tasks and projects comprised of tasks is provided in U.S. patent application Ser. No. 11/844,219, entitled "SYSTEM AND METHOD FOR MANAGING INHERENT PROJECT UNCERTAINTY," and filed Aug. 23, 2007, and Ser. No. 11/844,228, entitled "SYSTEM AND METHOD FOR DISPLAYING INHERENT PROJECT UNCERTAINTY," and filed Aug. 23, 2007, each of which are hereby incorporated herein by reference.

Defining a task with a specific start and finish or an estimated amount of effort facilitates the management of a project. Discrete tasks can be grouped, ordered, prioritized, and otherwise organized to allow a user (such as a project manager) to plan an overall project timeline and monitor task completion progress. As can be appreciated, complex or numerous tasks or projects can become difficult to manage without assistance. To assist with the management of multiple projects, project management software can be used to monitor and manage tasks of multiple projects simultaneously.

An example of an exemplary project management interface 10 that may be generated by project management software for managing multiple projects is illustrated in FIG. 1. As shown in FIG. 1, the project management interface 10 includes three projects 20 that are labeled "Project A," "Project B," and "Project C." The three projects are listed in a priority order in column 30, with projects depicted towards the top of the interface taking precedence over projects depicted towards the bottom of the interface. Each project is comprised of one or more tasks 35 that can represent an actual task, job, or assignment by zero or more users. Tasks 35 are similarly listed in priority order, with tasks that are presented higher on the interface taking priority over tasks that are presented lower on the interface. For example, Project A comprises five tasks 35 generically labeled Task 1 to Task 5, with each task having a higher priority than the task beneath it, i.e., Task 1 has a higher priority than Tasks 2-5, Task 2 has a lower priority than Task 1 and a higher priority than Tasks 3-5, etc. Since Project C is listed lower than Project A in the interface 10, Project C has a lower priority than Project A. Project C comprises nine tasks 35, with like tasks grouped into folders 40 for purposes of organizing the tasks. Each folder 40 may be labeled to describe the nature of the tasks that are contained within the folder (e.g., Design, Build, Test). As depicted in FIG. 1, Task 1 of Project A is at the highest priority level and Task 6 of Project B is at the lowest priority level.

The project management interface 10 also has a timeline 45 that is used to graphically depict a work period that is associated with each task, group of tasks, or project. The work period associated with a task is depicted by a bar 50. Each bar represents a period of time starting at the beginning of the task and ending with the completion of the task. Time may be measured in hours, days, weeks, or any other increment of time that is suitable for tracking progress on the corresponding task. Although the bars 50 are depicted as uniform in FIG. 1, it will be appreciated that the bars may be of different lengths. Project A is shown to have five tasks, each task having a bar 50 representing the work period for that task. As shown, each task of Project A is started and finished in sequence, beginning with Task 1 and ending with the completion of Task 5. In addition to bars 50 associated with each task 35, a set of bars 55 is presented for each project which represents the summed work period associated with all tasks for that project. For example, Project A has a set of five bars 55 which represent the aggregate work period associated with Tasks 1-5. Similarly, Project C is represented by nine bars 55 for the corresponding nine tasks. The three folders 40 contained in Project C are also represented by groups of three bars 60 that represent the grouped tasks associated with each folder. As can be appreciated, except for Project A and Task 1 of Project A, each project or task is dependent on the completion of the task immediately preceding it and is thus intended not to start until the preceding task is completed. The resulting project structure is therefore an idealized one, in that rarely are projects completed by the sequential execution of a series of tasks. All too often, projects are often run in parallel, requiring greater flexibility to manage multiple projects than is available via the project management interface 10 of FIG. 1.

DETAILED DESCRIPTION

Figure 1:
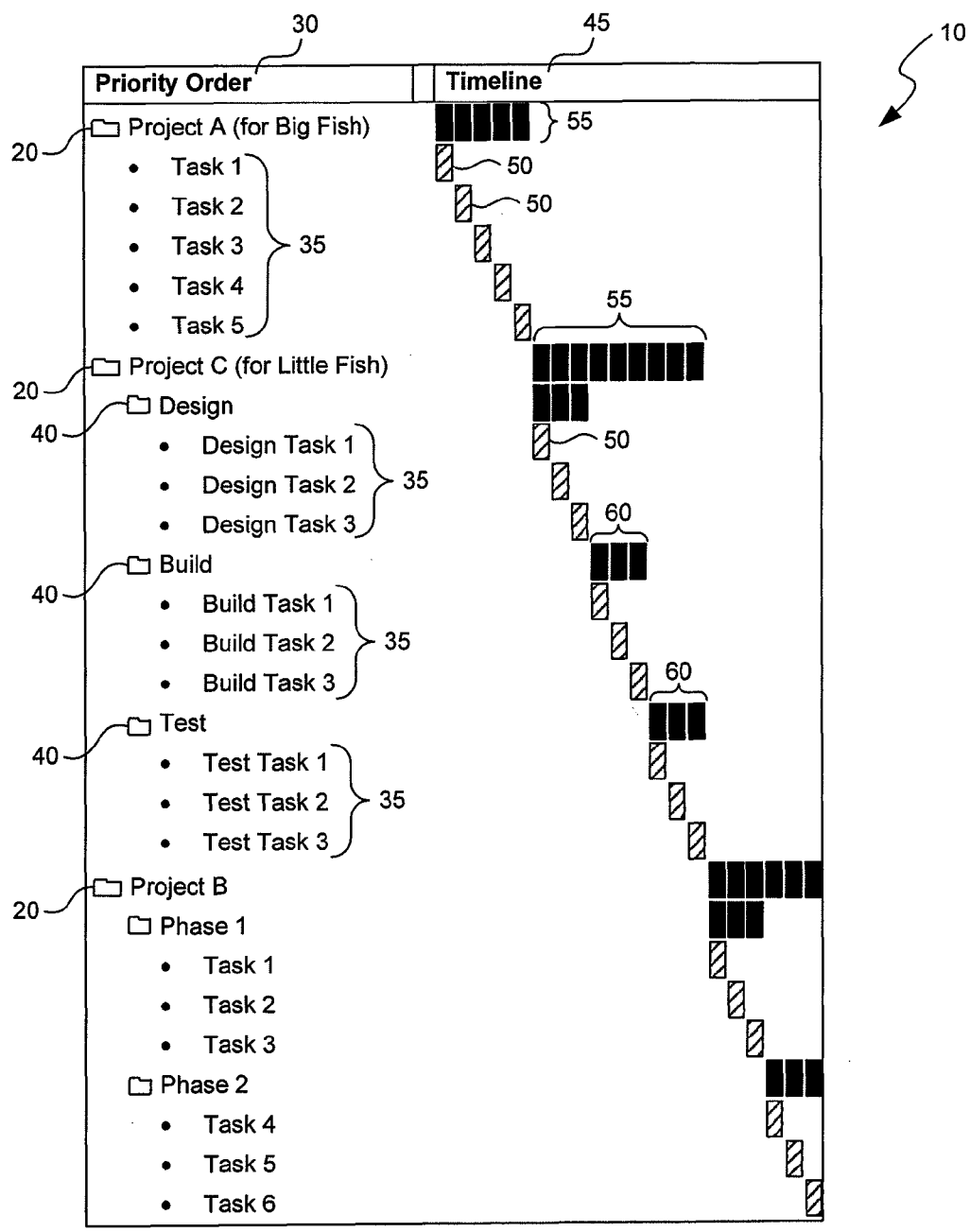
FIG. 1 is a screenshot of a representative project management interface with a project structure containing tasks, collections of tasks, and projects.

A software and/or hardware facility to improve the management of project schedules containing prioritized tasks is disclosed herein. The project management facility allows a user to create one or more work packages by selecting tasks from one or more existing projects. Each work package is a collection of tasks that are to be executed out of order from the project or projects from which the tasks were selected. At the same time, the facility maintains the prioritization of the tasks in the original project or projects from which the tasks were selected. When tasks are added to a work package, the facility recalculates the work package schedule and any impacted project schedules to reflect the re-prioritization of the task. By allowing a user to reprioritize tasks from a prioritized project schedule, while still retaining the integrity of the original project schedule from which tasks were selected, the disclosed facility allows a user to manage project schedules in a manner that is more consistent with the way that projects are managed in the real world.

In some embodiments, the facility generates a link between each task that is contained in a work package and the project from which the task was selected. The link allows a user to quickly shift between viewing a task in a work package context and viewing a task in a project context. Shifting between context views allows the user to better analyze the relationship of the selected task to other tasks. Other visual cues, such as arrow icons, may also be presented to the user to allow the user to quickly ascertain the relationship between tasks in the work package and corresponding project or projects.

In some embodiments, the facility allows groups of tasks or projects to be added to a work package. That is, a user may select a group of tasks or an entire project and add the selected group or project to the work package. When a group of tasks or a project is added to a work package, the facility recalculates the work package schedule and any impacted project schedules to reflect the re-prioritization of the group of tasks or project.

It will be appreciated that the disclosed work packages allow lower priority tasks or projects to be grouped and/or elevated in priority to improve the efficiency of the overall project plan or to deal with external factors that impact the overall project plan. For example, a user may oversee several unrelated projects that each include the task of ordering the same raw materials in accordance with different timelines, and the user may recognize that a lower cost can be achieved if all of the needed materials are ordered together. In another example, a user overseeing a planned but still-dormant project may learn that a task within that dormant project will become more difficult to complete because of the expected unavailability of a particular resource (a vendor, for example), and recognize a need to move that task to a high priority level that precedes the start date of the dormant project. In still another example, a user overseeing multiple projects may desire to proceed with a collection of multiple tasks that share a common characteristic, regardless of the timelines of the projects containing each of those tasks. For example, a project manager may desire to complete (by assigning a higher priority) or delay (by assigning a lower priority) all tasks involving the use of an expensive piece of manufacturing equipment, so as to influence the budget associated with the project plan. The use of work packages allows a user to easily and effectively perform a limited re-prioritization of tasks in order to achieve the desired gain in efficiency.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 2:
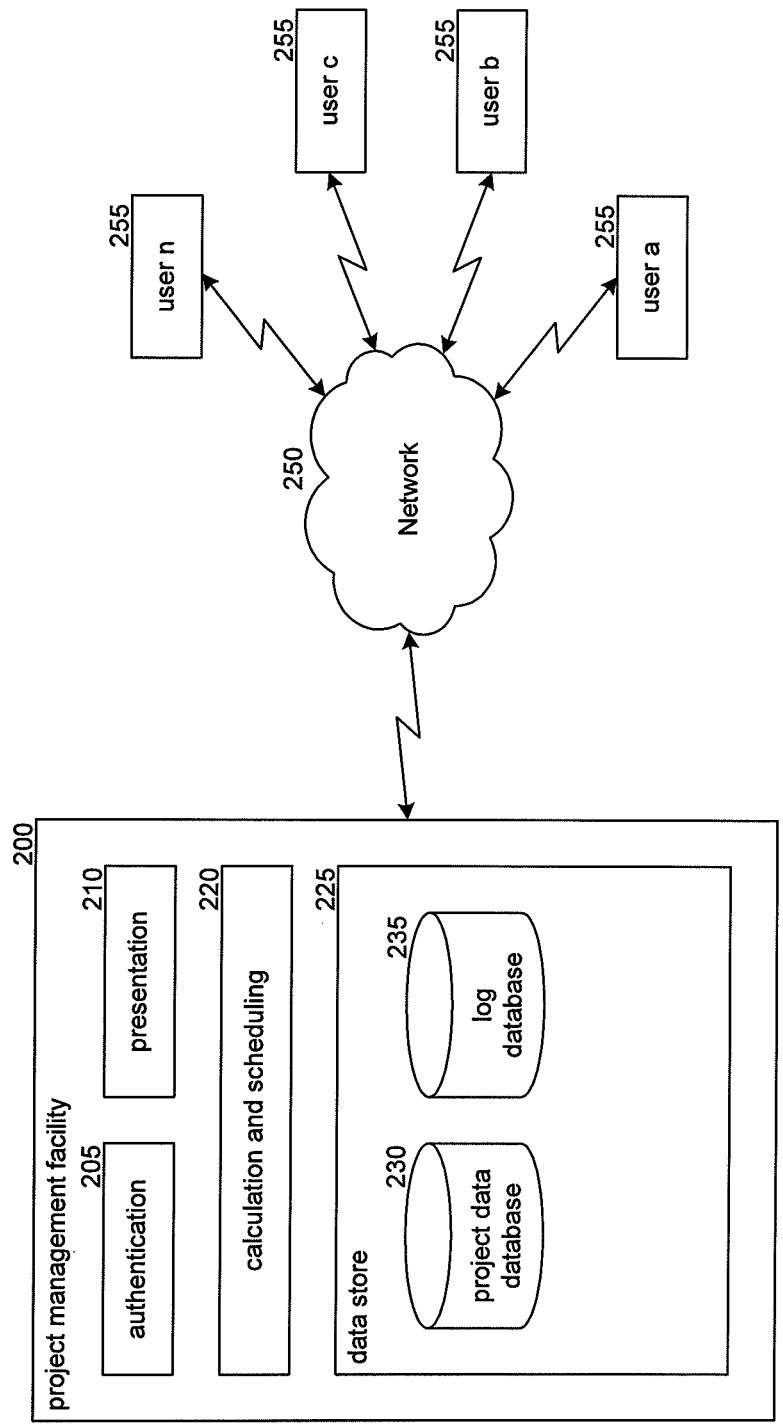
FIG. 2 is a block diagram that illustrates components of a project management facility that allows users to manage projects using work packages.

FIG. 2 is a block diagram illustrating components of a project management facility 200 ("the facility"). Users 255 interact with the facility via a network 250, such as the Internet. Users may be actual human users, such as members of a project or organization, computer programs, or other entities. The facility allows users to build and manage project schedules having prioritized tasks associated with projects. The facility has various components to allow users to manage projects. These components include an authentication component 205, a presentation component 210, a calculation and scheduling component 220 and a data store 225. The authentication component 205 authenticates the user 255 and grants the user 255 access to the facility. The presentation component 210 presents a project management interface to the user 255 and receives user requests and responses. The calculation and scheduling component 220 performs statistical calculations to calculate project schedules based on a prioritization or re-prioritization of tasks in projects. The facility can include other components that perform other functions. The various components of the facility can retrieve and store data related to their functioning in the data store 225, which includes a project data database 230 and a log database 235.

Figure 3:
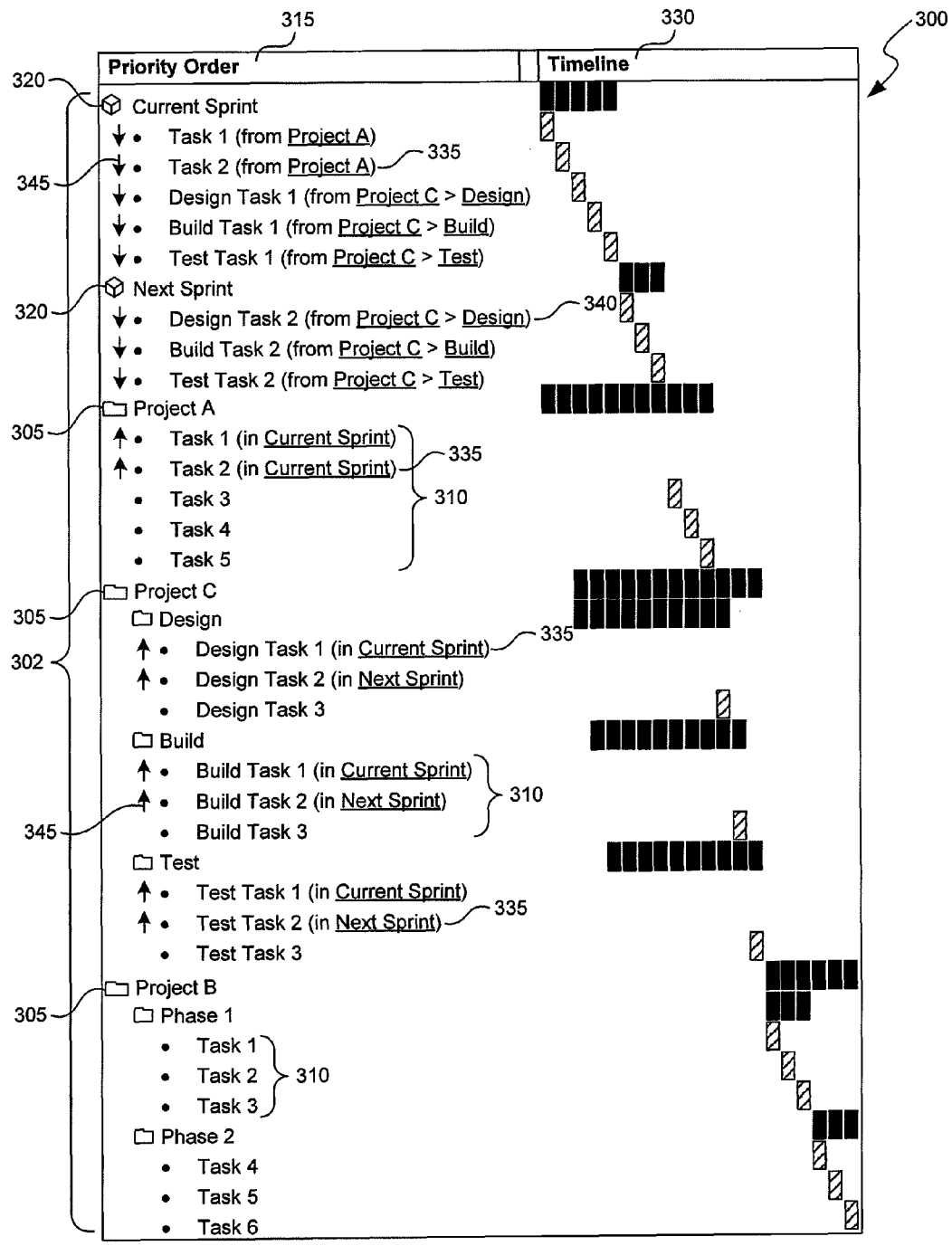
FIG. 3 is an exemplary project management interface generated by the facility and presented to a user.

FIG. 3 is a screenshot of an exemplary project management interface 300 generated by the facility 200 and presented to a user. The project management interface 300 depicts projects 305 that consist of one or more tasks 310. A user defines tasks 310 using an interface (not shown). Each task may be assigned to a responsible person or persons, and an estimate provided of an anticipated amount of time and/or effort required to perform each task. Additional details about the definition of tasks may be found in the previously-referenced U.S. patent application Ser. No. 11/844,219, entitled "SYSTEM AND METHOD FOR MANAGING INHERENT PROJECT UNCERTAINTY." Selecting the task allows a user to view and, depending on permissions, edit the corresponding details of the task.

The tasks 310 are arranged by priority, with higher priority tasks disposed towards the top of a priority order column 315 and lower priority tasks disposed towards the bottom of the priority order column. A user may drag-and-drop tasks into an appropriate project and into an appropriate priority order within that project. Similarly, projects 305 may be prioritized by the user, with projects placed towards the top of the priority order column 315 taking priority over projects placed towards the bottom of the priority order column. A user may drag-and-drop folders representing projects 305 to reprioritize the order of the projects. The facility will automatically schedule tasks in a sequential fashion based on their order within a project. For example, within the depicted "Project B," tasks 1-6 are executed in order over two project phases. Moreover, the facility will automatically reschedule tasks as a project is reprioritized with respect to other projects. For example, Project C tasks would be prioritized before Project A tasks if the Project C folder were moved to a higher priority (i.e., above Project A) in the priority order column 315. While projects are depicted in FIG. 3 as file folders and tasks as bullet points, it will be appreciated that other icons, color, or formatting may be used to distinguish between projects and tasks in the interface.

To enable a user to manage the planning and execution of projects, the project management interface 300 allows a user to define one or more work packages 320. Each work package 320 contains one or more tasks 310 that are selected from the list of presented tasks. That is, a user may select a task 310 and drag-and-drop the task into the desired work package, may right click on a task and select a work package in which to place the task, or may use other selection techniques to associate a task with a work package. As will be described in additional detail herein, the addition of a task 310 to a work package 320 does not result in the removal of that task from its normal position in the displayed project. Instead, the task is replicated in the work package and a link is generated by the facility between the task in the work package and the task in the project. Tasks in the work package are prioritized in the same fashion as tasks within a project. That is, tasks 310 are arranged by priority, with higher priority tasks disposed towards the top of the priority order column 315 and lower priority tasks disposed towards the bottom of the priority order column. Similarly, work packages 320 may be prioritized by the user, with work packages disposed towards the top of the priority order column 315 taking priority over work packages or projects disposed towards the bottom of the priority order column.

Work packages 320 may be named by the user to easily distinguish one work package over another work package. In the depicted example, the work package with the highest priority has been labeled "Current Sprint" and the work package with the next highest priority has been labeled "Next Sprint." The Current Sprint work package includes two tasks copied from Project A and three tasks copied from Project C. The Next Sprint work package includes three tasks from Project C. Each task in a work package also remains in the corresponding project, meaning that the same task is shown in two locations. As shown in FIG. 3, the work packages 320 do not contain any unique tasks as the entire contents of the packages are duplicates of existing tasks in projects. Alternatively, work packages 320 can contain unique tasks that are not copied from any other project. In the depicted example, work packages 320 are reflected by a small cube icon. It will be appreciated that other icons, colors, or formatting may be used to distinguish work packages from other elements in the project management interface.

By default, any tasks 310 added to a work package are displayed in the same priority order as the tasks in the associated projects. For example, in the Current Sprint work package, Task 1 and Task 2 are presented before Design Task 1 since Project A has a higher priority than Project C in the project plan. A user is allowed to rearrange the order of the tasks in the work package 320. When a user rearranges the priority of tasks in a work package 320, the facility 200 automatically updates the priority of the tasks in the corresponding project and vice versa.

Collectively, all related projects or work packages that are displayed in the project management interface 300 are referred to herein as a project plan 302. The project plan 302 may be stored by the facility in an electronic data structure or on a recordable medium. Although FIG. 3 depicts the two work packages 320 as prioritized before the projects 305, it will be appreciated that the work packages may be inserted anywhere in the project plan. A work package may be prioritized, for example, between Project A and Project C, between Project C and Project B, and after Project B. Projects occurring towards the top of the priority order column 315 will take priority over any work packages that are disposed lower in the priority order column.

The project management interface 300 also has a timeline 330 that is used to graphically depict a work period that is associated with each task, group of tasks, or project. The timeline 330 represents the work periods associated with each task, group of tasks, or project in a similar fashion to the timeline 45 of FIG. 1. It will be appreciated that the units of time represented by the blocks in the timeline can be days, hours, weeks, or any other increment of time that is suitable for tracking progress on the corresponding task. Although the bars are depicted as uniform in FIG. 3, it will be appreciated that the bars may be of different lengths or may be of the same length but represent different increments of time. The facility automatically schedules the work periods associated with each task, work package, or project based on the assigned priority of the task, work package, and/or project. For example, as depicted in FIG. 3 the Next Sprint tasks are scheduled before Project A tasks, and Project A tasks are scheduled before Project C tasks in the timeline 330.

To enable a user to easily navigate between work packages 320 and projects 305, the facility generates links 335 between a task in a work package and the project from which the task was selected. A link 335 in the work package 320 associates a work package task with the project that contains that task. For example, the link 335 in the Current Sprint work package for Task 2 indicates that the task is associated with Project A. Selecting the link (in the depicted case, a hyperlink labeled "from Project A") causes the project management interface 300 to shift so that the user is viewing Task 2 in Project A. Similarly, the facility generates a link 335 between a task in a project and the work package 320 to which the task is assigned. For example, the link 335 in Project A for Task 2 indicates that the task is associated with the Current Sprint work package. Selecting the link (in the depicted case, a hyperlink labeled "in Current Sprint") causes the project management interface 300 to shift so that the user is viewing Task 2 in the Current Sprint work package.

In some embodiments, the facility may generate a more detailed path for the link. For example, a link 340 associated with the Next Sprint work package indicates that Design Task 2 is associated with both Project C and the Design folder within Project C ("from Project C>Design"). The entire path may be presented to a user, or only a portion of the path may be presented to the user (i.e., the path may be collapsed to the lowest level). A user may select the "Project C" link to cause the project management interface to shift to display Project C, or the user may select the "Design" link to cause the project management interface to shift to display the Design folder within Project C.

In addition to generating a link between task locations in work packages and projects, the facility may also generate a visual cue 345 to allow the user to quickly ascertain the relationship between the work package and corresponding project or projects. As depicted in FIG. 3, the visual cue 345 is an arrow icon that is displayed to the left of a task. The arrow icon points in the direction of the corresponding work package 320 or project 305, as applicable, where the task may be found. For example, the arrow icon for Task 2 in the Current Sprint work package points downward in the interface since Task 2 is found lower on the interface in Project A. In a corresponding fashion, the arrow icon for Task 2 in Project A points upward in the interface, since Task 2 is found higher in the interface in the Current Spring work package. While an arrow icon is depicted in FIG. 3, it will be appreciated that other icons or visual cues (e.g., coloring, fonts) may be used to visually link the locations of tasks in the project plan 302. In some embodiments, the visual cues 345 are merely graphical and cannot be selected by a user in the interface. In some embodiments, the visual cues 345 are active links which operate in a similar fashion to links 335, namely by allowing the user to switch between task positions within the project plan 302.

The use of work packages 320 allows a user to quickly reprioritize tasks without losing the benefit of the prioritization that already exists within a particular project 305 or project plan 302. For example, the Current Sprint work package provides a new prioritization for the five work items listed in the package. As can be seen in FIG. 3, the work period for the Current Sprint package extends for five time units (five dark blocks) on timeline 330, as each task assigned to the Current Sprint package requires one time unit (one grey block). The performance of the five tasks under the Current Sprint package delays the start of the Next Sprint work package and further delays the finish of any subsequent project. For example, although Tasks 1 and 2 in Project A are completed very early in the timeline, the completion of the other tasks in the Current Sprint work package delay the completion of Tasks 3-5 in Project A. The overall work period for Project A on the timeline 330 has therefore been extended. Presumably, the user has therefore determined that the time delay in completion of Project A is offset by the efficiencies gained by the completion of the higher-priority tasks in the Current Sprint and Next Sprint packages.

Figure 4:
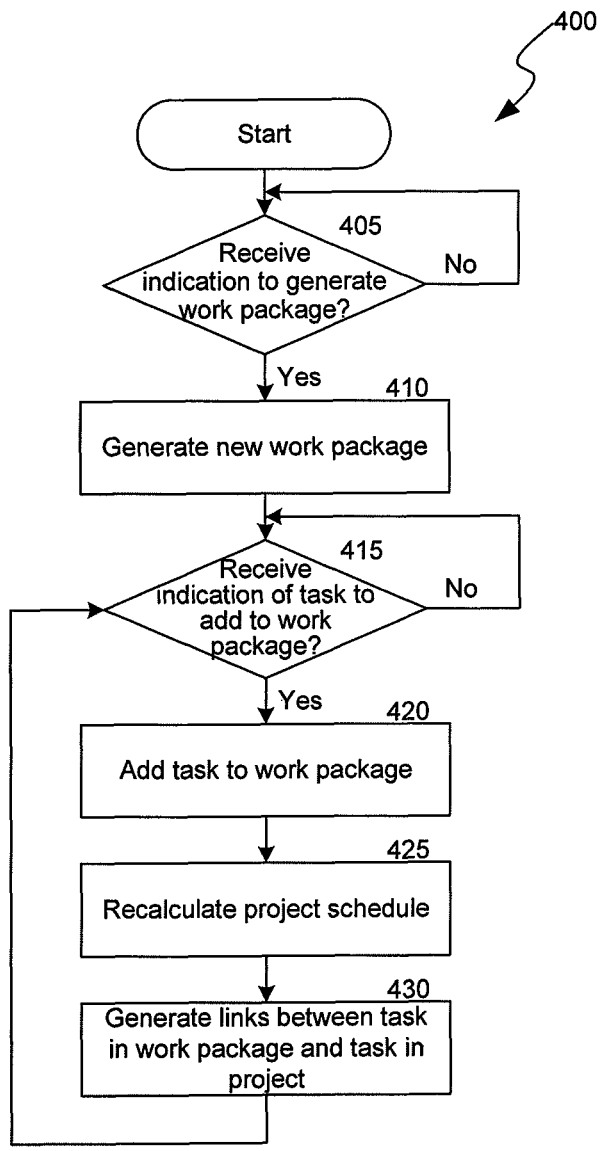
FIG. 4 is a flow chart of a process implemented by the facility to update schedules as a result of the use of work packages.

FIG. 4 is a flow chart of a process 400 implemented by the facility 200 to generate updated schedules as a result of the use of work packages 320. At decision block 405, the facility determines whether it has received an indication to generate a work package. Those skilled in the art will appreciate that the indication can be received in a variety of ways, such as when a user uses the project management interface to select an option to generate a new work package, or when a user selects a pre-defined work package from a list or menu. If an indication is not received, the process 400 returns to block 405 to wait for the receipt of an indication. If an indication is received, the process continues at block 410 where the facility generates a new work package. As can be appreciated, the generation of the new work package can involve, for example, the definition of a new work package by the user or the selection of a new pre-defined work package from a list or menu. The work package may be named (e.g., First Sprint, Next Sprint), may be categorized (e.g., a "planning" work package, a "materials procurement" work package, etc.), and may have other associated metadata such as creation date, owner, permissions to modify, etc.

Once a work package 320 has been generated, the facility waits to receive tasks for the work package. At decision block 415, the facility determines whether it has received an indication to add a task to the work package. Such an indication may be, for example, a user dragging and dropping a task into a work package. If no indication is received, the process 400 returns to block 415 to await the detection of an intent to add a task. If an indication is received, the process continues at block 420 where the facility adds the task to the work package. As described previously, a task may be selected by a user from an existing project, with the added task retaining an association with the existing project. At block 425, the facility recalculates the project plan schedule, accounting for any changes resulting from the addition of the task to the work package. To recalculate the project plan schedule, the facility may identify all tasks that have a lower priority than the task that was added to the work package and then delay the lower priority tasks by the expected work period of the added task to account for the added task. Lower priority tasks may be identified, for example, by identifying all work packages or projects that have a lower priority than the work project into which the task is being added. At block 430, the facility generates links between the task that was added to the work package and the same task in the existing project. The process 400 then returns to block 415 where the facility determines whether an indication was received of another task to be added to the work package. In this fashion, the facility allows a user to construct and populate work packages.

Figure 5:
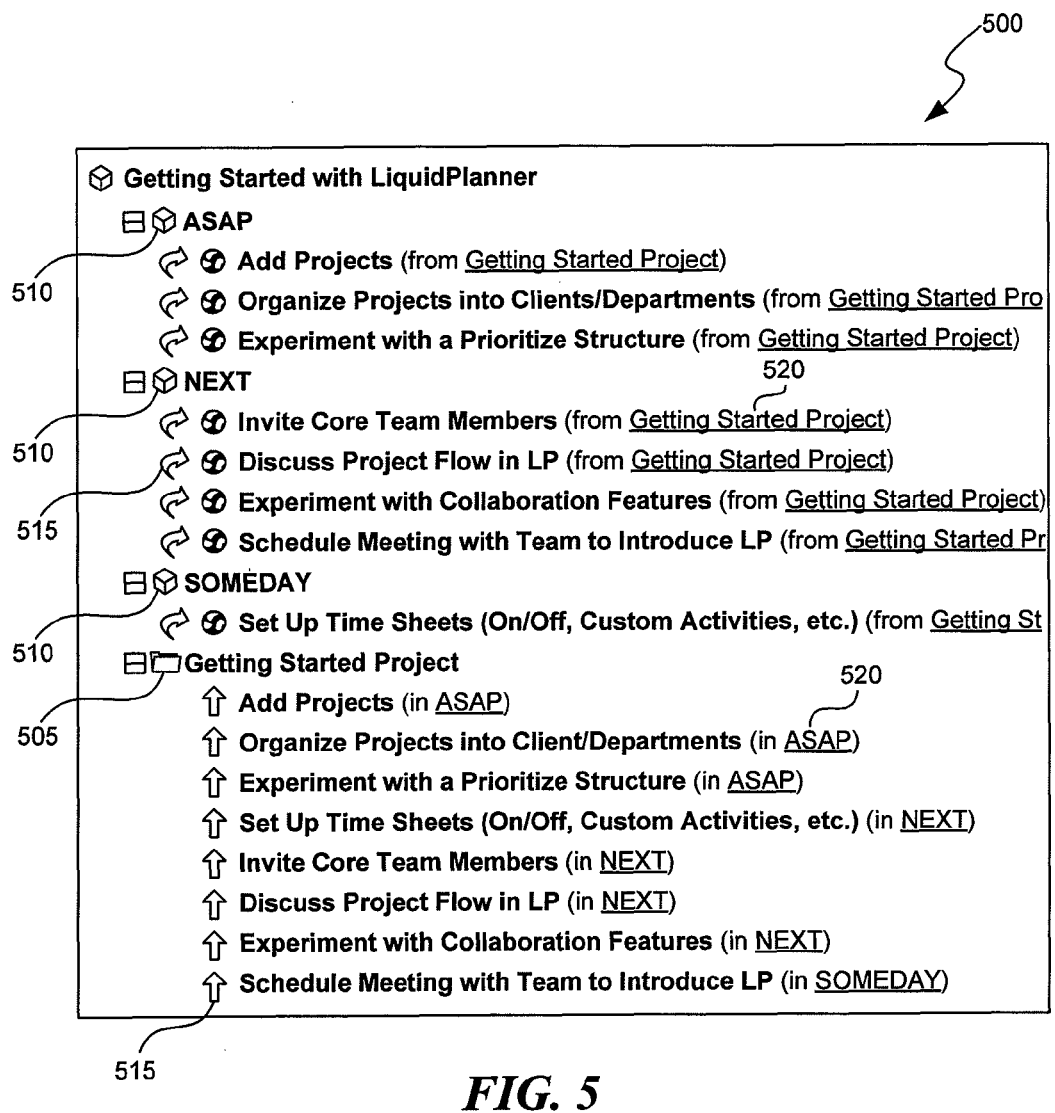
FIG. 5 is a screenshot depicting an alternate use of the project management facility.

FIG. 5 is a screenshot depicting an alternate use of the project management facility 200. The depicted example shows the project management facility generating a project management interface 500 that is being used to present a set of training materials. The training materials are listed in project 505 entitled "Getting Started Project." Each task in project 505 corresponds to a set of training materials, such as videos, digital copies of printed materials, etc. Work packages 510 have been used to segment the training materials and suggest the order that they should be reviewed. A work package entitled "ASAP" contains those tasks that should be performed immediately, a work package entitled "NEXT" contains those tasks that should be performed next, and a work package entitled "SOMEDAY" contains those tasks that should be performed at a user's leisure. Graphical icons 515 and links 520 allow a user to quickly navigate between the work packages and the project.

Figure 6:
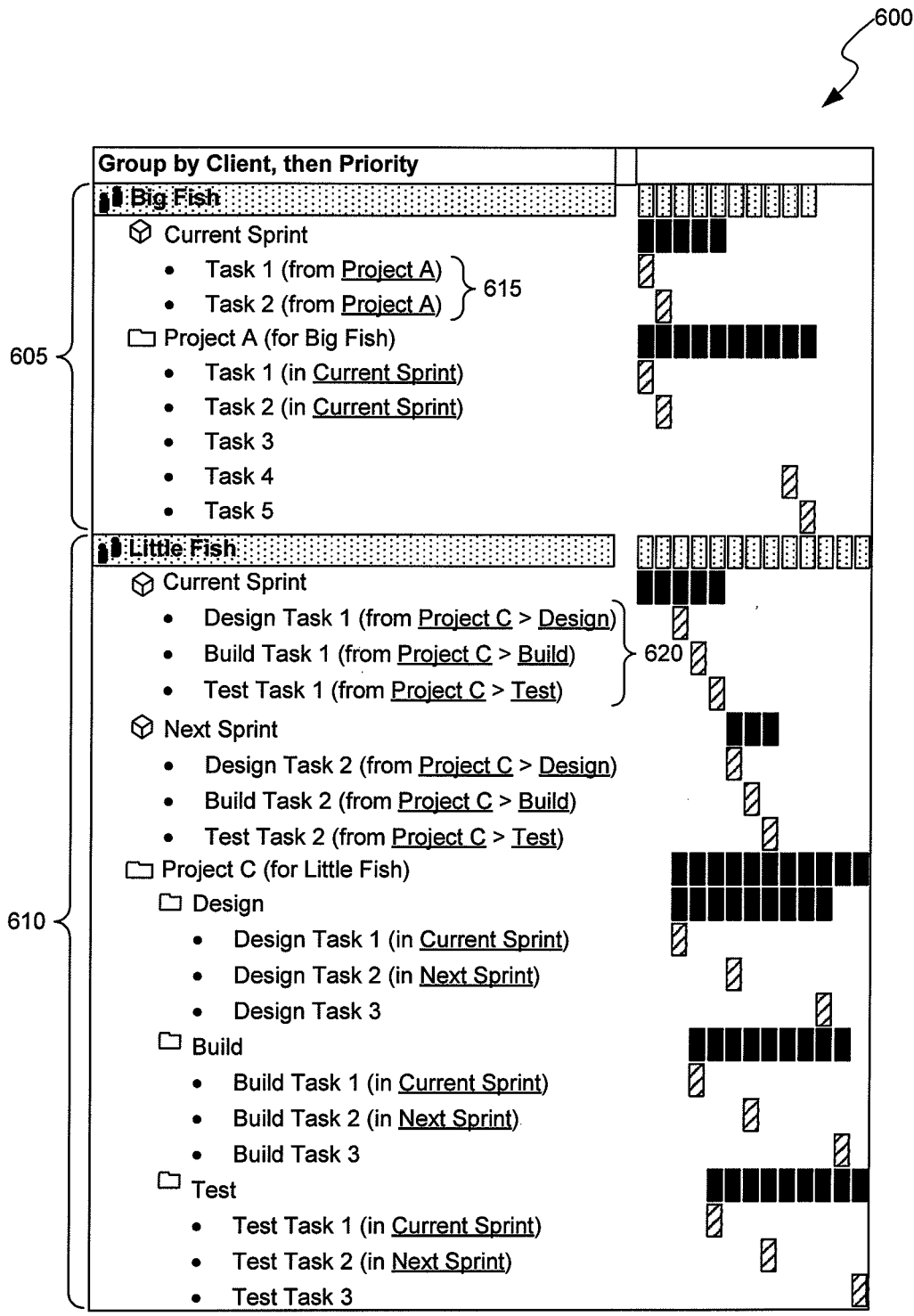
FIG. 6 is a screenshot depicting a project management interface in which work packages and projects are sorted first by client and then by priority.

FIG. 6 is a screenshot depicting a project management interface 600 generated by the facility 200 in which work packages and projects are sorted first by client and then by priority. In the depicted example, each project is associated with a different client. Project A is associated with client Big Fish, and Project C is associated with client Little Fish. A Current Sprint work package that has been constructed by a user contains tasks from both projects. Specifically, the Current Sprint work package contains Task 1 and 2 from Project A and Design Task 1, Build Task 1, and Test Task 1 from Project C. The facility allows a user to sort the project plan by multiple parameters. In the depicted example, the user has chosen to have the project plan sorted by client and then by priority. As a result, a first portion 605 of the interface is devoted to those tasks associated with the client Big Fish, and a second portion 610 of the interface is devoted to those tasks associated with the client Little Fish. In splitting the interface into two portions, the facility also splits each work package so that those tasks associated with each client are properly displayed. As a result, a first segment 615 of the Current Sprint work package is shown in the first portion of the interface since the tasks in the first segment are associated with the client Big Fish. A second segment 620 of the Current Sprint work package is shown in the second portion of the interface since the tasks in the second segment are associated with the client Little Fish. While the interface shows the project plan being sorted by client and by priority, it will be appreciated the project plan may be sorted using different parameters, such as by type of task, individual assigned to the task, importance of the task, etc.

In some embodiments, the various work packages, projects and tasks, can be moved with a computer controlled interface that allows the user to drag and drop, or cut/copy and paste, to change the priority of a package or task. In some embodiments, a user using a computer-controlled interface can use a mouse right-click to place a selected task into a work package, or to remove it from a work package. Alternatively, the placement of a task in a work package or the removal of a task from a work package can be accomplished with a keyboard action such as by pressing an "escape" or "delete" key.

While various embodiments are described in terms of the project plan and project management interface described above, those skilled in the art will appreciate that various changes to the project plan, project structure, and project display interface may be made without departing from the scope of the invention. Those skilled in the art will appreciate that the facility 200 may be implemented on any computing system or device. Suitable computing systems or devices include personal computers, server computers, hand-held or laptop devices, multiprocessor systems, microprocessor-based systems, network devices, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium for storing data. Software may include one or more program modules which include routines, programs, objects, components, data structures, and so on that perform particular tasks or implement particular abstract data types. The functionality of the program modules may be combined or distributed across multiple computing systems or devices as desired in various embodiments.

From the foregoing, it will be appreciated that specific embodiments of the invention have been described herein for purposes of illustration, but that various modifications may be made without deviating from the invention. Accordingly, the invention is not limited except as by the appended claims.

I claim:

1. A computer-implemented method of managing a project plan containing prioritized tasks, the method comprising:
    maintaining, by a computing system, a project plan having a plurality of projects, each of the plurality of projects having at least one task;
    creating, by the computing system, a work package that is configured to contain a plurality of tasks from at least two different projects;
    receiving, by the computing system, a selection of a task for inclusion in the work package, the task selected from tasks in one of the plurality of projects in the project plan;
    adding, by the computing system, a copy of the selected task to the work package while maintaining the selected task in the project from which it was selected;
    receiving, by the computing system, a prioritization of the selected task in the work package that is different from the prioritization of the selected task in the project from which it was selected;
    identifying, by the computing system, tasks in the plurality of projects that have a lower priority than the selected task in the work package;
    reprioritizing, by the computing system, the identified tasks in the plurality of projects to account for the received prioritization of the selected task in the work package; and
    presenting a graphical representation of the project plan on an output display.

2. The computer-implemented method of claim 1, further comprising associating a link with a task in a work package, wherein receiving a selection of the link causes the graphical representation to display one or more projects containing the selected task.

3. The computer-implemented method of claim 1, further comprising associating a link with a task in a project, wherein receiving a selection of the link causes the graphical representation to display one or more work packages containing the selected task.

4. The computer-implemented method of claim 1, further comprising:
    receiving a new task for inclusion in the work package, wherein the new task does not exist in any of the plurality of projects;
    adding a copy of the new task to the work package;
    receiving a prioritization of the new task in the work package;
    identifying tasks in the plurality of projects that have a lower priority than the new task in the work package;
    reprioritizing the identified tasks in the plurality of projects to account for the received prioritization of the new task in the work package; and
    presenting an updated graphical representation of the project plan on the output display.

5. The computer-implemented method of claim 1, wherein presenting the graphical representation of the project plan includes sorting the project plan by one or more predetermined parameters.

6. The computer-implemented method of claim 5, wherein one of the predetermined parameters is a client name.

7. The computer-implemented method of claim 5, wherein one of the predetermined parameters is a type of one or more tasks or an importance of a task.

8. The computer-implemented method of claim 5, wherein one of the predetermined parameters is the name of an individual assigned to one or more tasks.

9. The computer-implemented method of claim 1, wherein the receiving a selection of a task for inclusion in the work package comprises dragging and dropping the selected task from one of the plurality of projects in the project plan to the work package.

10. The computer-implemented method of claim 1, wherein creating a work package occurs automatically.

11. The computer-implemented method of claim 1, wherein creating a work package occurs in response to receiving manual input from a user.

12. The computer-implemented method of claim 1, wherein the selection of a task for inclusion in the work package is received automatically.

13. The computer-implemented method of claim 1, wherein the selection of a task for inclusion in the work package is received via manual input by the user.

14. A non-transitory computer-readable storage medium encoded with computer-executable instructions to cause a processor to execute a method for managing a project plan containing prioritized tasks, the method comprising:
    maintaining a project plan having a plurality of projects, each of the plurality of projects having at least one task;
    creating a work package that is configured to contain a plurality of tasks from at least two different projects;
    receiving a selection of a task for inclusion in the work package, the task selected from tasks in one of the plurality of projects in the project plan;
    adding a copy of the selected task to the work package while maintaining the selected task in the project from which it was selected;
    receiving a prioritization of the selected task in the work package that is different from the prioritization of the selected task in the project from which it was selected;
    identifying tasks in the plurality of projects that have a lower priority than the selected task in the work package;
    reprioritizing the identified tasks in the plurality of projects to account for the received prioritization of the selected task in the work package; and
    presenting a graphical representation of the project plan on an output display.

15. The non-transitory computer-readable storage medium of claim 14, further comprising associating a link with a task in a work package, wherein receiving a selection of the link causes the graphical representation to display one or more projects containing the selected task.

16. The non-transitory computer-readable storage medium of claim 14, further comprising associating a link with a task in a project, wherein receiving a selection of the link causes the graphical representation to display one or more work packages containing the selected task.

17. The non-transitory computer-readable storage medium of claim 14, further comprising:
- receiving a new task for inclusion in the work package, wherein the new task does not exist in any of the plurality of projects;
- adding a copy of the new task to the work package;
- receiving a prioritization of the new task in the work package;
- identifying tasks in the plurality of projects that have a lower priority than the new task in the work package; and
- reprioritizing the identified tasks in the plurality of projects to account for the received prioritization of the new task in the work package; and
- presenting an updated graphical representation of the project plan on the output display.

18. The non-transitory computer-readable storage medium of claim 14, wherein presenting the graphical representation of the project plan includes sorting the project plan by one or more predetermined parameters.

19. The non-transitory computer-readable storage medium of claim 18, wherein one of the predetermined parameters is a client name.

20. The non-transitory computer-readable storage medium of claim 18, wherein one of the predetermined parameters is a type of one or more tasks or an importance of a task.

21. The non-transitory computer-readable storage medium of claim 18, wherein one of the predetermined parameters is the name of an individual assigned to one or more tasks.

22. The non-transitory computer-readable storage medium of claim 14, wherein the receiving a selection of a task for inclusion in the work package comprises dragging and dropping the selected task from one of the plurality of projects in the project plan to the work package.

23. The non-transitory computer-readable storage medium of claim 14, wherein the creating a work package occurs automatically.

24. The non-transitory computer-readable storage medium of claim 14, wherein the creating a work package occurs in response to receiving manual input from a user.

25. The non-transitory computer-readable storage medium of claim 14, wherein the selection of a task for inclusion in the work package is received automatically.

26. The non-transitory computer-readable storage medium of claim 14, wherein the selection of a task for inclusion in the work package is received via manual input by the user.

* * * * *